United States Patent [19]

Clemens

[11] Patent Number: 5,130,532
[45] Date of Patent: Jul. 14, 1992

[54] LIGHT BARRIER GRID WITH ELECTRICALLY DECOUPLED EMITTERS AND DETECTORS WHICH ARE OPERATABLE IN SYNCHRONISM

[75] Inventor: Klaus Clemens, Freiburg, Fed. Rep. of Germany

[73] Assignee: Erwin Sick GmbH Optik-Elektronik, Waldkirch, Fed. Rep. of Germany

[21] Appl. No.: 572,979

[22] PCT Filed: Feb. 2, 1989

[86] PCT No.: PCT/EP89/00103
  § 371 Date: Sep. 13, 1990
  § 102(e) Date: Sep. 13, 1990

[87] PCT Pub. No.: WO89/07276
  PCT Pub. Date: Aug. 10, 1989

[30] Foreign Application Priority Data

Feb. 2, 1988 [DE] Fed. Rep. of Germany ....... 3803033

[51] Int. Cl.⁵ .............................................. G01V 9/04
[52] U.S. Cl. ..................... 250/221; 340/555

[58] Field of Search ............... 250/221; 340/556, 555, 340/557

[56] References Cited

U.S. PATENT DOCUMENTS 3,746,863 7/1973 Pronovost ..................... 340/556
4,266,124 5/1981 Weber ........................... 250/221

Primary Examiner—David C. Nelms
Assistant Examiner—T. Davenport
Attorney, Agent, or Firm—Townsend & Townsend

[57] ABSTRACT

A light barrier grid is described with several light sources (5) arranged alongside one another and light receivers (6) which are each associated with one light source. A light source control (9) and also a receiver control (10) are provided in order to energize the light sources and the light receivers individually and in time sequence for the transmission or reception of light pulses. The light receivers (6) are energizable by the receiver control (10) in dependence on the received light pulses for synchronization with the light sources (5).

21 Claims, 7 Drawing Sheets

LIGHT BARRIER GRID WITH ELECTRICALLY DECOUPLED EMITTERS AND DETECTORS WHICH ARE OPERATABLE IN SYNCHRONISM

The invention relates to a light barrier grid comprising a plurality of light sources arranged alongside one another and light receivers each associated with one light source; a light source control and also a receiver control, with the light sources and the light receivers being respectively individually activatable one after the other in time sequence to transmit and receive light pulses respectively.

The light sources of such light barrier grids transmit light beams in a time sequence which monitor a predetermined spatial region or a predetermined area. The light sources are individually activated in accordance with a predetermined time sequence. The light receivers must also be activated in a corresponding sequence and in the same rhythm, i.e. must in particular be connected to an electronic evaluation circuit. Thus, with a respectively activated light source it is only one light receiver which is activated, as a rule the light receiver fixedly associated with this light source.

The requisite synchronisation between the transmitter side and the receiver side has previously been produced by special connection lines between the light source control and the receiver control which is of disadvantage, in particular with light sources and light receivers arranged at opposite sides of the region to be monitored.

The invention is thus based on the object of providing a light barrier grid of the initially named kind which, with a simple construction and reliable operation, ensures problemfree synchronised operation of the light sources and the light receivers, in particular also when connection lines are absent between the light source unit and the light receiver unit.

This object is satisfied in accordance with the invention in that the light receivers are activated by the receiver control in dependence on the received light pulses.

As a result of this construction special connection lines between the transmitter and receiver units can be omitted, which is of decisive advantage, in particular when the light sources and the light receiver are arranged at opposite sides of the region to be monitored. As a synchronisation of the receiver unit always takes place directly starting from the received light pulses the light barrier grid of the invention requires practically no adjustment. It is suitable for the monitoring of surfaces and spatial regions of the most diverse dimensions and is characterised amongst other things by its insensitivity to vibrations and also by a low power consumption.

The receiver control is expediently capable of being switched over for the time sequential activation of the light receivers in dependence on the appearance of the received light pulses.

This switching over from one light receiver to the next can for example always take place when the expected light pulse has been timely received. The sequence of the receiver control can be preset in correspondence with the light source energisation circuit. The activation of the light receivers takes place, by way of example, cyclically, i.e. that after an activation of the last light receiver in the activation sequence the first light receiver of the sequence is again activated.

The receiver control includes, in accordance with a particularly advantageous variant, means for detecting and indicating the absence of a light pulse expected during activation of the respective receiver and the receiver control is resettable in the absence of the expected light pulse into an initial state in which a defined first light receiver is activatable. Accordingly, if at least one light path between one light source and one light receiver is disturbed by an obstacle then this leads directly to the transmission of an indication signal which signalises the intervention in the region being monitored or in the surface being monitored. The fact that the receiver control is simultaneously reset into a defined output state in the absence of a respectively expected light pulse makes it much simpler to newly synchronise the light barrier grid after the intervention. Moreover, it is possible, by corresponding choice of the pauses between the transmitted light pulses, to produce, with the switching back to a defined first light receiver, also the desired fixed association of specific light receivers to the respective light sources.

For this purpose provision is made, in accordance with a particularly advantageous further development of the invention, that a synchronisation pause between the energisation of the last light source and the first light source can be set by the light source control, with the synchronisation pause being larger than a time window during which a light pulse is expected, the time window being associated with at least each of the second to last light receivers during activation thereof.

Accordingly, the appearance of the synchronisation pause first acts in the same manner on the receiver control as an intervention in the region to be monitored by an obstacle. I.e. the receiver control is reset on the occurrence of the synchronisation pause into the initial state in which the first light receiver of an activation cycle is energised. Since, following the synchronisation pause, the first light source of the transmitting cycle is again energised, it is ensured that the light pulse transmitted by this first light source is received by the light receiver associated with this first light source. The respective association of further light sources and light receivers is ensured by the predeterminable further sequence of the transmitter control and receiver activation respectively.

The receiver control accordingly recognises a jump from the last light source to the first light source, and thus the start of a new cycle as a result of the synchronisation pulse which is longer than the remaining transmission pauses. This distinction of the pauses between the transmitted pulses is exploited, in accordance with the invention, for the synchronisation between the transmitter side and the receiver side.

On switching on the apparatus it can transpire that a lack of synchronisation is present, for example the first time the apparatus is cycled through upwardly or downwardly, i.e. transmitters and receivers which are in particular not associated with one another are simultaneously energised. This however only takes place during the first upward movement or downward movement. The desired association is already present again on the second cycle of the light sources and light receivers.

It must be ensured that switching on further to the next light receiver takes place when the region to be monitored is undisturbed, despite the longer synchronisation pause, with the receipt of the light pulse originating from the first light source. For this purpose provision is expediently made that the receiver control circuit has a blanking recognition circuit for detecting a complete cycle from the first to the last light receiver; and that the time window associated with the subsequently activatable first light receiver during which the relevant light pulse is expected is matched to the synchronisation pause, i.e. is made larger in dependence on the synchronisation pause.

In a predeterminable run-through from the first to the last light receiver it is sufficient to monitor the energisation control of the last light receiver, since in this case energisation of this kind can only occur when all the preceding light receivers of the relevant cycle have previously been activated.

The means for detecting and indicating the absence of the expected light pulse advantageously include a release logic circuit which can be locked on to the detection of the absence of the relevant light pulse and which is expediently resettable in dependence on the detection of a complete cycle from the first to the last light receiver. With this arrangement monitoring of the activation of the last light receiver is sufficient in the event of a predetermined sequence of energisation of the light receivers from the first to the last light receiver since the latter is only energised with a preceding complete cycle.

Latching of the release logic circuit has the consequence that the apparatus output is inactive. Renewed activation of the apparatus output is only possible with a complete cycle of the transmitters and receivers when the region to be monitored is undisturbed. The synchronisation hereby takes place in two steps when several elements can radiate into the receiver element.

If an obstacle enters into the region to be monitored or into the surface to be monitored then the receiver control will be reset, as a consequence of the absence of the expected light pulse, into the initial state in which for example the first light receiver is activated. If several light sources can radiate into the first light receiver then the synchronisation takes place in two steps. In the first step the receiver latches onto the transmitter as soon as a light pulse from the first light receiver is detected while the time window associated with this receiving element is open. In this way the intervention recognition circuit can be reset. If the light pulse detected by the first light receiver does not originate from the associated first light source then the receiver and transmission elements are initially pulsed in displaced manner. During this the activation of one of the subsequent light receivers will fall on the longer synchronisation pause. This has the consequence that the light receiver control is switched back to the first light receiver. This first light receiver is so timely activated that it will receive the light pulse which is subsequently to be transmitted from the first light source, providing the monitored region continues to be undisturbed. The subsequent run-up of the light sources and light receivers accordingly then takes place in full synchronisation.

In accordance with a practical layout of the light barrier grid of the invention the transmitter or receiver modules can be respectively associated with the light sources and/or light receivers respectively, with these modules being connected together into a shift register which is energisable by the respective control. The respective shift register can be a kind of recirculating register, however, the energisation must always take place in such a way that in each case only one module is energised at the receiver side and at the transmitter side respectively.

Advantageous possibilities of application of the light barrier grid of the invention lie in particular in its construction as an indicator in the field of door, space and escalator monitoring, with it in particular serving for the monitoring of surfaces. It is preferably used as a passage monitoring device, in particular for door control in lifts.

Further particularly advantageous developments of the invention are set forth in the subordinate claims.

Light emitting diodes which operate in the infrared region are in particular suitable as the light transmitters, with these diodes having a good quantum yield and a long life. The light receivers can be matched to the emission wavelength of the light sources.

The transmitter or receiver elements respectively can be accommodated, including the respectively associated controls in transmitter and receiver strips. Lenses for focussing of the light beams and filter disks to make it more difficult to see into the construction of the systems from the outside are expediently provided in front of the transmitting and receiving elements respectively. The spacing of the light source and light receivers relative to one another and the number of these elements can be varied and thus matched to the prevailing requirements.

The invention will now be explained in the following with reference to an embodiment and to the drawing in which are shown.

Figure 1:
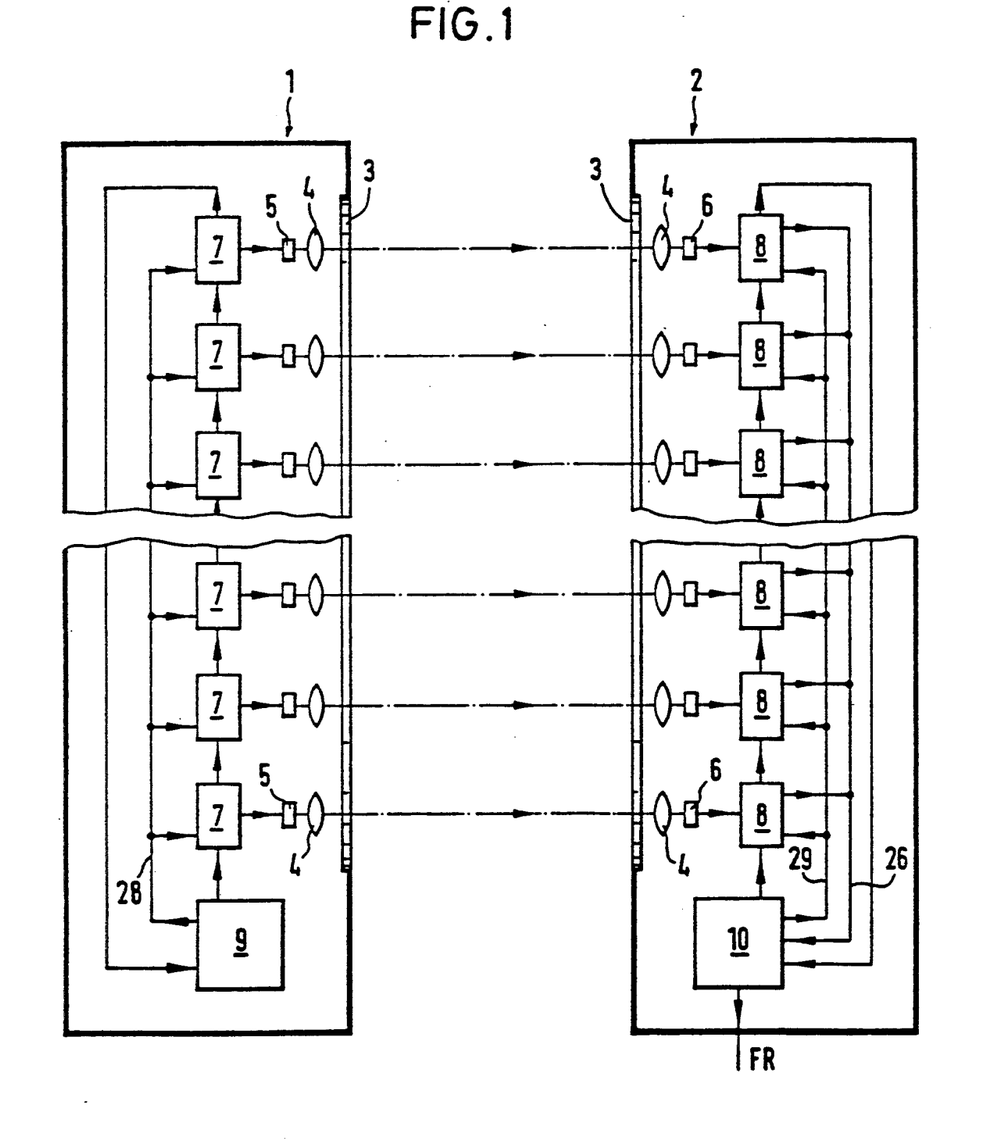
FIG. 1 an embodiment of a light barrier grid which serves for area monitoring and which has a transmitter row and a receiver row, FIG. 2 the time sequence of the activation pulses of the light sources for a transmitter row with seven light sources, FIG. 3 an embodiment of a receiver row, FIG. 4 the time sequence of activation of the receiver modules associated with the light receivers, FIG. 5 the time sequence of the voltages at various points of the circuit associated with the receiver row of FIG. 3, with the circuit being shown in the synchronised state, FIG. 6 the time sequence of the voltages at various points of the circuit associated with the receiver row in FIG. 3 during an intervention in the light path, and FIG. 7 the time sequence of the voltages at various points of the circuit associated with the receiver row of FIG. 3 directly after freeing of the light path.

In FIG. 1 a light barrier grid is shown with a transmitter row 1 and a receiver row 2.

The transmitter row 1 includes seven transmitter modules 7 with a respective light source 5 being associated with each of the transmitter modules 7.

The transmitter row 1 furthermore includes a light source control 9 for activating the transmitter modules 7 which are connected together in the manner of a shift register.

The transmitter modules 7 which form the shift register are set and timed by the light source control 9. The output of the uppermost, last transmitter module 7 is led back to an input of the light source control 9 in order to form a type of recirculating shift register. The setting input of the first lower transmitter module 7 is energisable by the light source control 9. The clock inputs of the transmitter modules 7 are connected with a common clock line 28 originating from the clock source control.

The receiver row 2 includes seven light receivers 6 with a respective receiver module 8 being connected after each of the light receivers 6. The receiver modules 8 are again connected together in the manner of a shift register.

The shift register formed by the receiver modules 8 is timed and set by a receiver control 10. The output of the last, uppermost receiver module 8 is in turn fed back to the receiver control 10 to form a recirculating shift register. The setting input of the first, lowermost receiver module 8 is activatable by the receiver control 10. The clock inputs of the receiver modules 8 are connected to a common clock line 29 emerging from the receiver control 10.

The outputs of the receiver modules 8 are connected to a common, time multiplex line 26 which leads to the receiver control 10.

The light beams which are indicated in FIG. 1 and which extend between the transmitter row 1 and the receiver row 2 also show the association of the respective light receivers 6 to the relevant light sources 5. Thus, by way of example, the lowermost, first light receiver 6 is to be associated with the lowermost, first light source 5. Respective lenses 4 are associated with the light sources 5 and also with the light receivers 6 for the focussing of the light beams.

Filter disks 3 are arranged in front of the light receiver 6 and the light sources 5, or the lenses associated with them in order to make it more difficult to see in from the outside.

The activation of the transmitter modules 7 and receiver modules 8, which are connected into respective shift registers, by the light source control 9 and the receiver control 10 respectively, takes place in each case in such a way that it is always only one transmitter module 7 or one receiver module 8 respectively that is activated.

Figure 2:
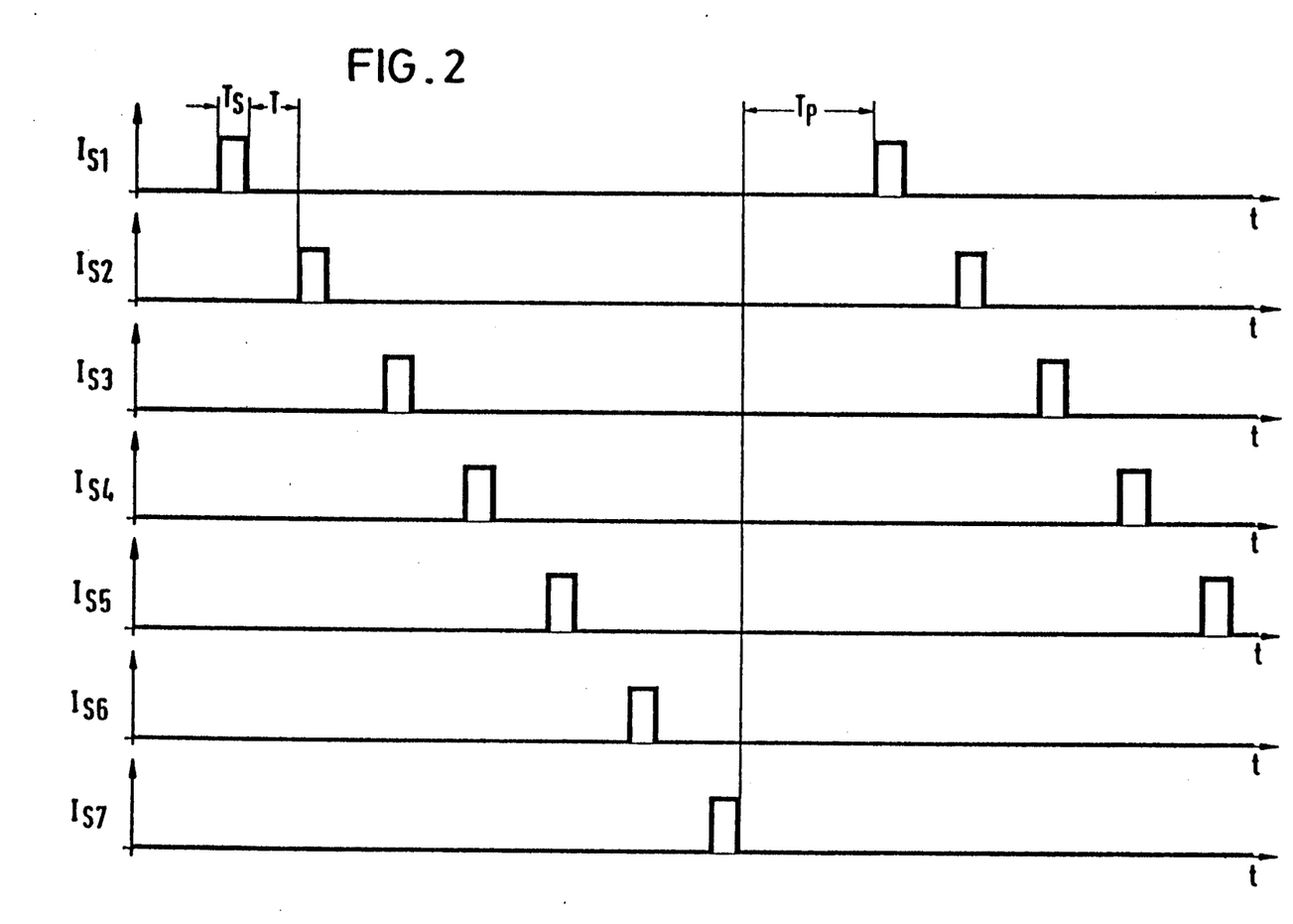

The time sequence of the activation pulses for the seven transmitter modules 7 of the transmitter row 1 is shown in FIG. 2. Here the transmitter pulses $I_{S1}$ to $I_{S7}$ associated with the seven transmitter modules 7 are respectively recorded along the time axis t.

The duration of a respective transmitter pulse $I_{Si}$ amounts to $T_S$ whereas the time interval between two transmitter pulses of a cycle is T, and the synchronisation pause $T_P$ is present between the last transmitter pulse $I_{S7}$ of one cycle and the first transmitter pulse $I_{S1}$ of the next cycle.

The synchronisation pause $T_P$ is of the same duration as the duration $T_S$ of a transmitter pulse plus two times T taken together.

The light source control 9 is laid out in such a way that several light sources 5 are not simultaneously active at any time.

Figure 3:
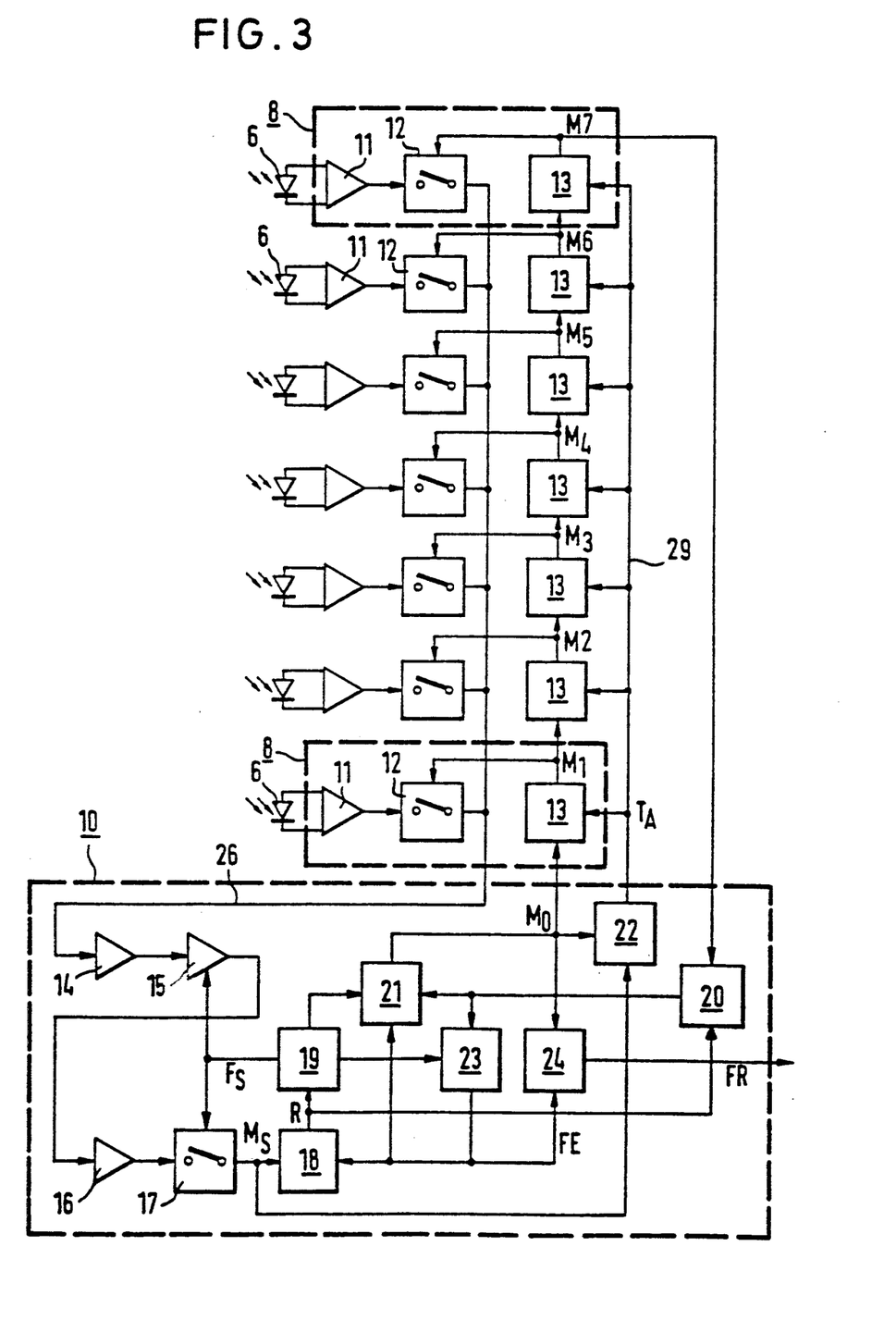

FIG. 3 shows an embodiment of a receiver row 2.

The seven receiver modules 8 which are respectively connected after one of the light receivers 6 each include a preamplifier 11, an electronic switch 12 connected after the preamplifier 11 and also a storage or memory cell 13, the output of which energises the electronic switch 12.

The receiver control 10 of the receiver row 2 includes an amplifier 14, a pulsed differential amplifier 15 connected after it, a comparator 16, a switch 17 connected to its output, an initialising logic circuit 18, a control logic circuit 19, a blanking recognition circuit 20, a presetting logic circuit 21, a clock control circuit 22, an intervention recognition circuit 23 and also a release logic circuit 24.

The optical radiation received by the light receivers 6 is converted into electrical signals which are amplified in the preamplifiers 11. The output signals of the preamplifiers 11 are passed to the electronic switches 12 which are activated by the storage cells 13.

These electronic switches 12 form a multiplexer. For this purpose the outputs of these electronic switches 12 are connected to a common time multiplex line 26 by which the signal present in time multiplex is passed to the amplifier 14. The output signal of the amplifier is supplied to the input of the pulsed differential amplifier 15. The pulsed differential amplifier 15 has a sample and hold circuit. The output voltage of such a sample and hold circuit follows the input voltage in the switched on state in just the same way as that of an analog switch. In the switched off state the voltage value is however stored at the instant of switching off.

The output signal of the pulsed differential amplifier 15 is supplied to the comparator 16 in order to transmit a digitised or binary signal to the electronic switch 17. The binary signal passes via the electronic switch 17 to the clock control circuit 22 and also to the initialising logic circuit 18. The control logic circuit 19 includes a time generator which is reset by the initialising logic circuit 18.

The control logic circuit 19 sets the time window for the respectively following light pulse which is to be received in that it activates the pulsed differential amplifier 15 and the electronic switch 17.

The logic control circuit 19 furthermore triggers the intervention recognition circuit 23 and the presetting logic circuit 21 which converts the shift register formed by the storage cells 13, which form a recirculating register, directly and indirectly via the clock control 22 into an output state in which all the storage cells 13 apart from the first lower storage cell 13 are reset.

The presetting logic circuit 21 and also the intervention recognition circuit 23 are respectively triggered by the blanking recognition circuit 20 which is set by the last, upper storage cell 13 of the shift register and is reset again by the initialising logic circuit 18.

The intervention recognition circuit 23 detects an intervention in the light path as soon as the time generator of the control logic again closes the relevant time window without a light pulse having been received. This results in locking of the release logic circuit 24. For this purpose an output of the intervention recognition circuit 23 is connected to an input of the release logic circuit 24. The apparatus output is in this case inactive. A subsequent activation of the apparatus output can only take place after a triggering of the presetting logic circuit 21 by a blanking, i.e. by the blanking recognition circuit 20. A blanking of this kind is only detected when the last upper storage cell 13 is set, i.e. after a full cycle without intervention in the region to be monitored.

Figure 4:
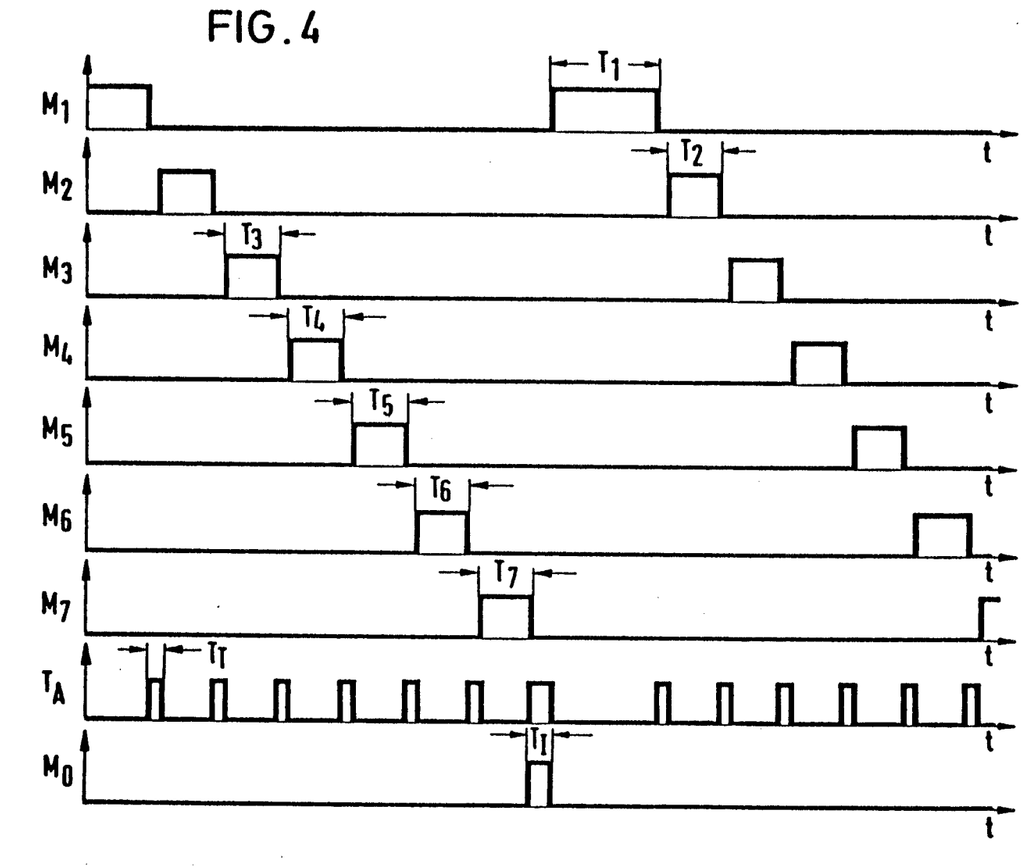

The time sequence of the activation of the receiver modules 8 of a receiver strip 2 in accordance with FIG. 3 equipped with seven modules is shown in FIG. 4.

The voltages $M_1$ to $M_7$ which are applied to the control inputs of the electronic switches 12, the voltage $T_A$ applied to the clock line 29 and also the voltage $M_0$ present at the input of the first, lowermost storage cell 13 are respectively recorded relative to the time axis t. The seven electronic switches 12 are each activated for a duration $T_1$ to $T_7$. The shifting clock pulses each have a duration or a pulse width $T_T$ and an initialising pulse has a duration $T_I$.

The initialising of the shift register formed by the storage cells 13 takes place by the resetting of all storage cells by means of an initialising pulse of the duration $T_I$ which appears on the clock line 29, and also by the setting of the first lower storage cell 13 by means of an input pulse $M_0$. As it is only the first storage cell 13 which is set during initialising there is always only one of the storage cells 13 which is active during the course of the further pulsing or cycling and accordingly only one of the electronic switches 12 is conductive.

The respectively active electronic switch 12 is deactivated with the rising flank of the clock pulse. The activation of the next electronic switch takes place with the falling flank of this clock pulse.

The input signal $M_0$ to the first storage cell 13 occurs simultaneously with the initialising pulse $T_I$ and has the same pulse width. This pulse width $T_I$ of the initialising pulse is approximately twice as large as the pulse width $T_T$ of a normal shift timing pulse.

The duration $T_1$ of the activation of the first electronic switch 12 is longer than the duration of activation of the remaining electronic switches since here the transmitter side synchronisation pause during the jump from the activation of the last light source 5 to the activation of the first light source 5 must be taken into account.

Figure 5:
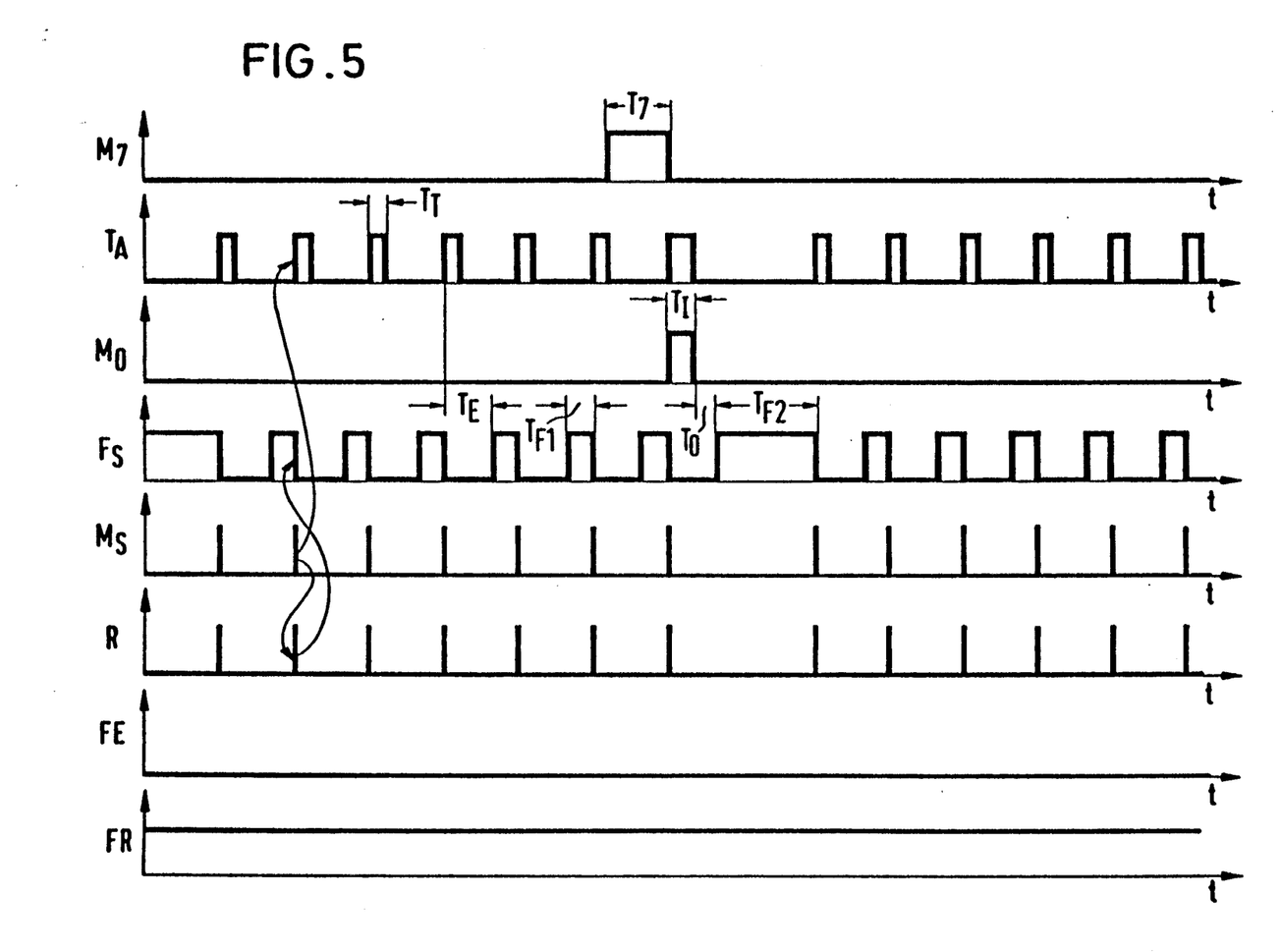

FIG. 5 shows the time sequence of the control signals of the receiver strip 2 equipped with seven receiver modules 8 in accordance with FIG. 3, with the strip being in the synchronised state in which no interruption of the transmitted light beams occurs.

The individual control signals are respectively entered along the time axis t.

$F_S$ shows the voltage at the control input of the pulsed differential amplifier 15, $M_S$ the output voltage of the electronic switch 17, R the voltage at the resetting input of the logic control circuit 19, FE the output voltage of the intervention recognition circuit 23 and FR the output voltage of the release logic circuit 24. The control voltage $F_S$ defines a time window during which a respective light pulse is expected. $T_E$ gives the duration between a shift timing pulse $T_T$ and the opening of the time window $F_S$, $T_0$ the duration between the initialising $T_I$ of the shift register and the opening of the time window $F_S$ and $T_{F1}$ or $T_{F2}$ respectively the duration of the time window.

Accordingly the duration of a time window is $T_{F1}$ after a shift pulse and $T_{F2}$ after initialising.

The further designations correspond to those of FIG. 4.

In the synchronised state, i.e. when the first receiver module 8 is activated and ready to receive, when the first light source 5 is activated, the shift timing frequency of the receiver strip 2

$$f_{Empf} = \frac{1}{T_E + T_{F1}}$$

is the same size as the clock frequency of the transmitter strip 1

$$f_{Sende} = \frac{1}{T_S + T}.$$

Furthermore, in this case the sum of the duration $T_S$ and the synchronising pause $T_P$, namely $$T_s + T_P = 2(T_S + T)$$

is the same size as the parameter related to the receiver $$I_I + T_0 + T_{F2}.$$

In the synchronised state the time window $F_1$ and $F_2$ are closed by the received signals, i.e. by the output voltages $M_S$ of the switch 17, and the control logic 19 is reset. The opening of the time window takes place after the time $T_E$ or $T_0$ respectively when the amplifier has stabilised.

Accordingly, if a light pulse is received during the respective time window and an output voltage $M_S$ is accordingly generated at the output of the switch 17 then this leads to a voltage R at the reset input of the control logic 19. In this way the timing generator of this logic control circuit 19 is reset whereby the previously opened time window is also closed. With the appearance of the voltage $M_S$ at the output of the switch 17 the next clock pulse is furthermore initiated via the clock control 22. The associated electronic switch 12 (see FIG. 3) is deactivated by the rising flank of the relevant clock pulse.

An activation of the following electronic switch 12 (see FIG. 4) takes place with the subsequent falling flank of the relevant clock pulse. The opening of the respective time window, i.e. the activation of the differential amplifier 15 and also of the switch 17 take place in contrast somewhat delayed, i.e. after transient response of the amplifier or after a corresponding time set by the timing generator.

As the respective light pulse in the synchronised state is always received on time, when intervention in the light path is missing, i.e. within the relevant time window, no setting of the intervention recognition circuit 23 occurs, and thus no blocking of the release logic circuit 24. The voltage FE at the output of the intervention recognition circuit 23 thus retains its value logic zero, and the voltage at the output of the logic release circuit 24 retains its value logic one.

Figure 6:
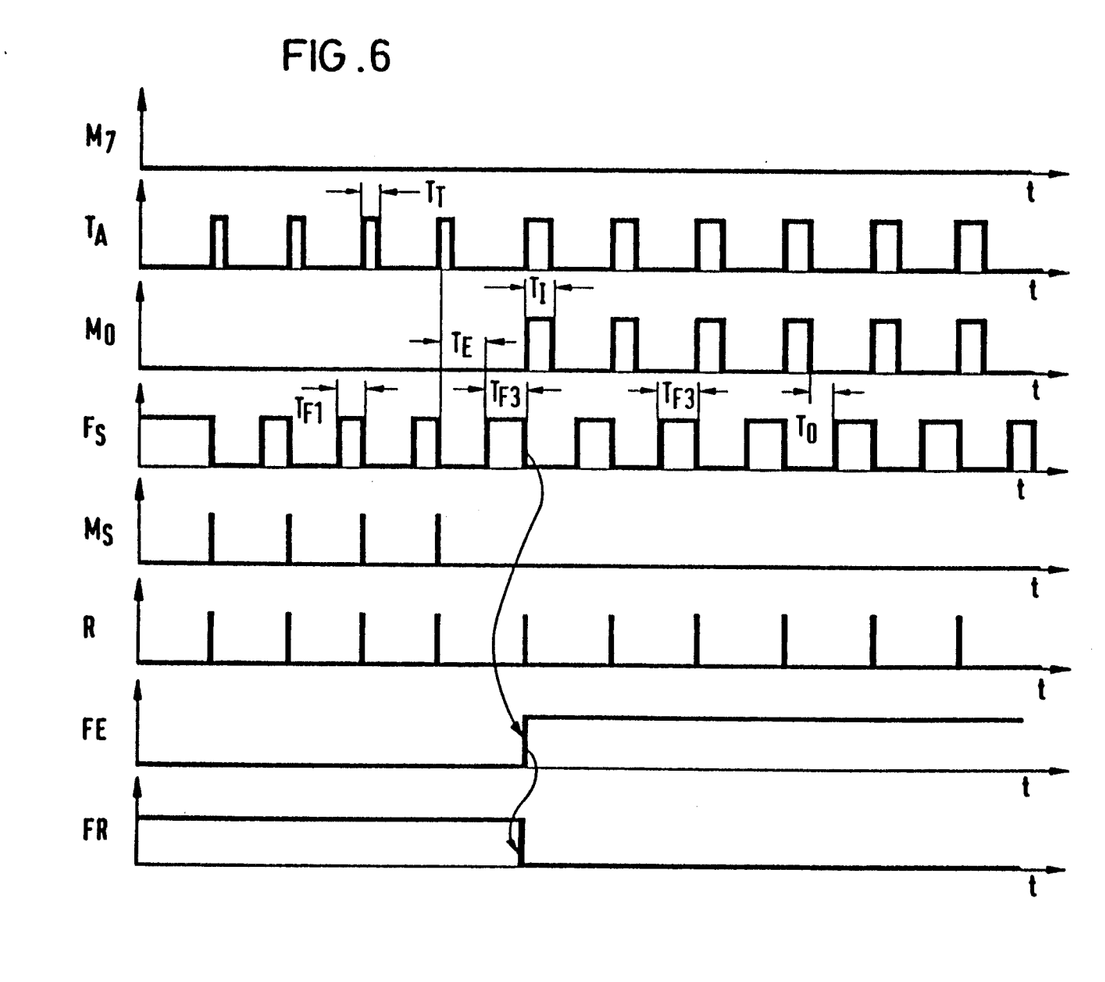

The time sequence of the same control voltages at the relevant points of the circuit of FIG. 3 is shown in FIG. 6 with an intervention in the light path.

This intervention takes place in the synchronised state in the fifth light path.

After a duration $T_{F3}$ the relevant time window is closed again without a pulse having been received, the intervention recognition circuit 23 is set and the release logic circuit 24 is reset and an initialising of the shift register is initiated. The initialising takes place again for the duration $T_I$. After the intervention recognition circuit 23 has been set the latter has a voltage FE at the output with the value logic one. In contrast the voltage FR at the output of the logic release circuit 24 returns to the value logic zero.

The first receiver module 8 is activated by the falling flank of the initialising pulse $T_I$, i.e. the first electronic switch 12 is closed. The time window is opened again at the expiry of the time interval $T_0$.

This process repeats itself so long as the first light receiver 6 receives no light pulse within the time window $T_{F3}$. The intervention recognition circuit 23 thereby remains set while the logic release circuit 24 remains latched.

Figure 7:
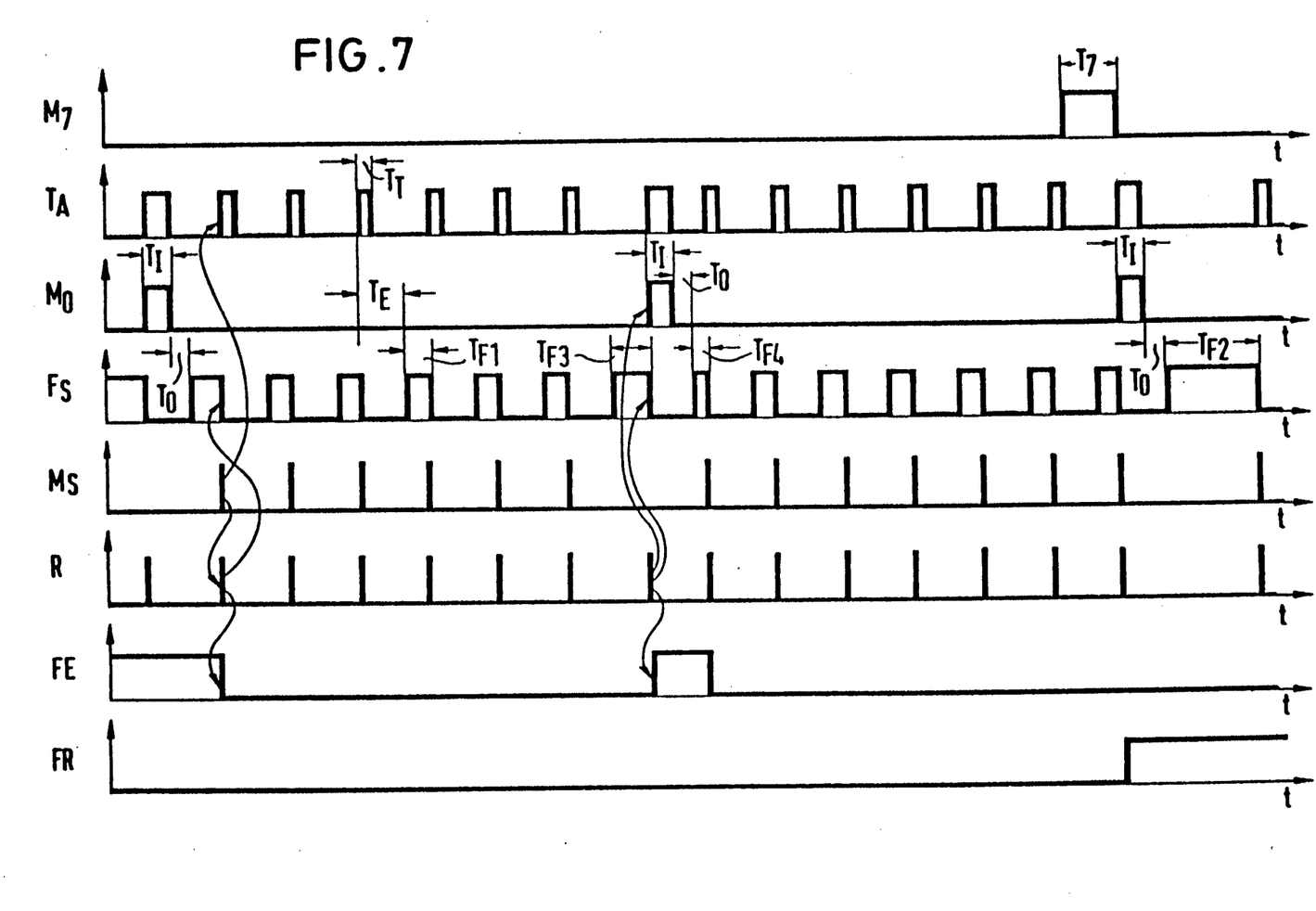

FIG. 7 shows the time sequence of these control voltages at the relevant points of the circuit of FIG. 3 directly after freeing of the light path, or of the region being monitored.

The subsequent synchronisation takes place in two steps when several light sources 5 can radiate into the first light receiver 6.

In the first step the receiver locks onto the transmitter as soon as a light flash or pulse arises at the first light receiver 6 while the relevant time window is open. In this way the intervention recognition circuit 23 is reset so that its output again initially adopts the voltage FE logic zero. This has however no effect on the output voltage FR of the logic release circuit 24, i.e. the release logic circuit 24 initially remains blocked.

In the embodiment shown in FIG. 7 the detected light pulse or light flash does not originate from the first light source 5 so that the light receivers 6 are pulsed displaced relative to the light sources 5 and lag relative to the latter. In the illustrated example the activation of one of the subsequent receiver modules 8 takes place during the synchronisation pause $T_P$. Accordingly no light pulse is received within the time window F3 of the duration $T_{F3}$.

From this it follows that the intervention recognition circuit 23 will be set again and that an initialising of the shift register will be effected for the time duration $T_I$.

The time window F4 of the duration $T_{F4}$ is opened in sufficient time after the expiry of the time $T_0$ in order to receive the light pulse from the first light source 5 and to achieve the desired synchronism in a second step.

The release of the logic release circuit 24 finally takes place after a complete cycle.

Since, for the described light grid, the synchronisation of the receiver side takes place directly through the light pulses, connection lines between the transmitter and receiver size can be avoided. On switching through between the individual transmitters and receivers comparatively small pauses are first present between the individual actuations or excitations. A longer pause only occurs on springing from the last transmitter to the first transmitter, and correspondingly from the last receiver to the first receiver, with this larger pause being determined by the synchronisation pause $T_P$ at the transmitter side. Thus the receiver side knows when the jump from the last transmitter to the first transmitter takes place at the transmitter side and the start of a new cycle takes place. This distinction in the pause between the pulses is exploited in accordance with the invention for the synchronisation between the transmitter and receiver sides. It is fundamentally also conceivable to execute a synchronisation of this kind in dependence on different pulse lengths.

By way of example it must be expected that a lack of synchronisation is present on switching on the apparatus during the first run-up (run down), i.e. transmitters and receivers which are not associated with one another are simultaneously activated. This takes place however only during the first run-up. During the second cycle the desired synchronisation between the transmitter strip and receiver strip is already present.

In the illustrated embodiment the synchronisation pause $T_P$ can also be regarded as the pause between two sequential cycles.

Even when the two strips are completely covered over relative to one another by an obstacle the synchronisation starts in the same manner as on switching on the apparatus following disappearance of the obstacle.

Decisive is also the fact that a fault signal is initiated each time the transmitter and receiver get out of phase since this getting out phase can only be attributed to the presence of an obstacle, i.e. to the interruption of one, several or all light paths.

The invention claimed is:

1. Light barrier grid comprising several light sources (5) arranged alongside one another and light receivers (6) each associated with one light source; a light source control (9) and also a receiver control (10), wherein the light sources and the light receivers are respectively individually activatable one after the other in time sequence to transmit and receive light pulses respectively, wherein the light source control (9) and the receiver control (10) which is electrically decoupled from the latter are operatable in synchronism, wherein at least one of the light receivers (6) can be activated in dependence on the receipt of a preceding light pulse and wherein the receiver control (10) can be reset to a first light receiver following the absence of an expected light pulse or after the activation of a last light receiver, characterised in that each of these light receivers is respectively activated in dependence on the time of occurrence of the previously received light pulse; in that a synchronisation pause ($T_P$) between the activation of a last light source and of a first light source can be preset; and in that the receiver control (10) can be reset to the first light receiver in dependence on the occurrence of the synchronisation pause ($T_P$).

2. Light barrier grid in accordance with claim 1, characterised in that the receiver control (10) includes means (19, 23, 24) for the detection and indication of the absence of a light pulse expected during activation of the respective receiver; and in that the receiver control (10) is resettable in the absence of the expected light pulse into an initial state in which a defined first light receiver (6) is activated.

3. Light barrier grid in accordance with claim 1, characterised in that the synchronisation pause ($T_p$) which is set by the light source control (9) between the activation of a last light source and of a first light source (5) is larger than a time window ($T_{F3}$) during which a light pulse is expected, the time window being associated with at least one of the second to the last light receivers (6) during activation thereof.

4. Light barrier grid in accordance with claim 3, characterised in that the receiver control (10) has a blanking recognition circuit (20) for detecting a complete cycle from the first to the last light receiver (6); and in that the time window ($T_{F2}$) associated with the subsequently activatable first light receiver (6) is made larger in dependence on the duration of the synchronisation pause ($T_P$).

5. Light barrier grid in accordance with claim 1, characterised in that the means (19, 23, 24) for detecting and indicating the absence of an expected light pulse include a release logic circuit (24) which can be locked with the detection of the absence of the relevant light pulse.

6. Light barrier grid in accordance with claim 5, characterised in that the release logic circuit (24) is resettable in dependence on the detection of a complete cycle from the first to the last light receiver (6).

7. Light barrier grid in accordance with claim 1, characterised in that transmitter modules (7) are associated with the light sources (5); and in that the transmitter modules are connected into a shift register which can be controlled from the light source control (9).

8. Light barrier grid in accordance with claim 1, characterised in that receiver modules (8) are associated with the light receivers (6); and in that the receiver modules are connected into a shift register controllable by the receiver control (10).

9. Light barrier grid in accordance with claim 1, characterised in that each receiver module (8) includes a storage cell (13) for the formation of a shift register and also an electronic switch (12) which is energisable by the latter, with the switch (12) being arranged between the associated light receiver (6) and a common time multiplex line (26) which leads to the receiver control (10).

10. Light barrier grid in accordance with claim 1, characterised in that the receiver control (10) includes at the input side a pulsed differential amplifier (15) with a sample and hold circuit and also preferably an electronic switch (17) connected to the latter which can be controllable during a respective time window ($T_F$) via a logic control circuit (19) having a time generator.

11. Light barrier grid in accordance with claim 1, characterised in that the output signal (MS) of the differential amplifier (15) or of the switch (17) is supplied to a timing control circuit (22) which acts on the memory cells (13) and also to an initialisation logic circuit (18), the output of which is connected with a resetting input of the control logic circuit (19) in order to reset its time generator.

12. Light barrier grid in accordance with claim 1, characterised in that the receiver control (10) includes a presetting logic circuit (21) triggerable by the logic control circuit (19) and the blanking recognition circuit (20), with the presetting logic circuit energising the first storage cell (13) and also the clock control (22) in order to reset the shift register into the initial state in the absence of an expected light pulse, or on the detection of a full cycle up to the last storage cell (13), with only the first storage cell (13) being set in the initial state.

13. Light barrier grid in accordance with claim 1, characterised in that the blanking recognition circuit (20) is settable by the last storage cell (13) and is resettable by the initialising logic circuit (18).

14. Light barrier grid in accordance with claim 1, characterised in that the means (19, 23, 24) for the recognition and indication of the absence of an expected light pulse includes, apart from the logic control circuit (19) and also the release logic circuit (24), in addition an intervention recognition circuit (23) which is triggerable by the logic control circuit (19) and preferably by the blanking recognition circuit, with the intervention recognition circuit delivering an output signal as soon as a relevant time window is closed without a light pulse having been received.

15. Light barrier grid in accordance with claim 14, characterised in that the output signal of the intervention recognition circuit (23) is supplied to the logic release circuit (24) in order to latch the latter.

16. Light barrier grid in accordance with claim 1, characterised in that the output signal of the intervention recognition circuit (23) is supplied to the initialising logic circuit (18) and also to the presetting logic circuit (21) for the resetting of the time generator of the control logic (19) and of the shift register into the initial state.

17. Light barrier grid in accordance with claim 1, characterised in that the release logic circuit (24) is energisable by the output of the presetting locig circuit (21) in order to be delatched after triggering of the presetting logic circuit by the blanking recognition circuit (20).

18. Light barrier grid in accordance with claim 1, characterised in that the light sources (5) and the light receivers (6) are arranged on opposite sides of the region to be monitored.

19. Light barrier grid in accordance with claim 1, characterised in that the light sources (5) are formed as light emitting diodes connected into a matrix.

20. Light barrier grid in accordance with claim 1, characterised in that means are provided for recognising the number of the respectively provided light sources (5) and/or light receivers (6) and also preferably for automatic adaptation of the respective control to the given number of elements.

21. Light barrier in accordance with claim 1, characterised by its use to monitor throughways, in particular for door control in lifts.

* * * * *